United States Patent [19]

Pask

[11] Patent Number: 4,551,064

[45] Date of Patent: Nov. 5, 1985

[54] TURBINE SHROUD AND TURBINE SHROUD ASSEMBLY

[75] Inventor: George Pask, Stanton-by-Bridge, England

[73] Assignee: Rolls-Royce Limited, London, England

[21] Appl. No.: 737,900

[22] Filed: May 24, 1985

Related U.S. Application Data

[63] Continuation of Ser. No. 464,145, Feb. 7, 1983, abandoned.

[30] Foreign Application Priority Data

Mar. 5, 1982 [GB] United Kingdom ................. 8206620

[51] Int. Cl.[4] ................................................ F02C 7/18

[52] U.S. Cl. ................................. 415/116; 415/199.5; 415/174; 415/200; 415/115

[58] Field of Search ............... 415/115, 116, 200, 174; 416/224

[56] References Cited

U.S. PATENT DOCUMENTS

| | | | |
|---|---|---|---|
| 2,720,356 | 10/1955 | Erwin | 415/115 |
| 3,293,030 | 12/1966 | Child | 416/224 |
| 3,864,056 | 2/1975 | Gabriel | 415/116 |
| 4,157,232 | 6/1979 | Bobo et al. | 415/116 |
| 4,222,707 | 9/1980 | Drouet et al. | 415/116 |
| 4,247,249 | 1/1981 | Siemers | 415/200 |
| 4,273,824 | 6/1981 | McComas | 415/200 |
| 4,317,646 | 3/1982 | Steel et al. | 415/116 |
| 4,329,113 | 5/1982 | Ayache et al. | 415/116 |
| 4,336,276 | 6/1982 | Bill et al. | 415/174 |
| 4,422,648 | 12/1983 | Eaton et al. | 415/174 |

FOREIGN PATENT DOCUMENTS

| | | |
|---|---|---|
| 1308771 | 3/1973 | United Kingdom . |
| 1330893 | 9/1973 | United Kingdom . |
| 2035466A | 6/1980 | United Kingdom . |

*Primary Examiner*—Larry Jones

*Attorney, Agent, or Firm*—Cushman, Darby & Cushman

[57] ABSTRACT

To enable shroud segments in a gas turbine rotor blade stage to operate at high temperatures with an adequate margin of safety, the shroud segments are mounted and cooled such that they are thrust outwards against seatings on surrounding high strength support structure by the gas pressure in the turbine passage, the shroud segments being provided with strengthening ribs or the like so that the outward thrust is transferred to the support structure through a plurality of load paths distributed over the outer sides of the shroud segments as necessary to avoid overstressing.

9 Claims, 2 Drawing Figures

TURBINE SHROUD AND TURBINE SHROUD ASSEMBLY

This is a continuation of application Ser. No. 464,145, filed Feb. 7, 1983, now abandoned.

The present invention relates to a metallic shroud assembly for an axial flow gas turbine.

One of the factors affecting efficient operation of axial flow gas turbine aeroengines is the amount of cooling air which it is necessary to use in order to keep metallic turbine components operating at safe temperatures for the materials of which they are made. Because cooling air is extracted from the compressor (i.e. from an earlier part of the thermodynamic cycle) and passed through turbine components, the work which it would have done in the turbine is largely lost, with deleterious effects on the power and specific fuel consumption of the aeroengine. Manufacturers are therefore anxious to reduce the amount of cooling air taken by various turbine components without reducing the service life or safety of their engines.

One type of turbine component which has required a large amount of cooling air, is the metallic shroud ring surrounding the first or high pressure stage of turbine blades, the shroud ring being composed of a plurality of segments to allow for circumferential expansion and contraction due to temperature changes. This turbine shroud, like the turbine blades which it circumscribes, experiences high temperatures and pressures and therefore—again like the turbine blades—has been a superalloy component requiring cooling with relatively large amounts of cooling air bled from the compressor.

It is desirable to reduce shroud cooling air consumption, but if the amount of cooling air passed through and over the shroud segments is reduced, the shroud segments will reach higher temperatures, thereby decreasing component life and margin of safety due to reduced strength and greater oxidation rates at the higher temperatures. Greater oxidation rates can be combatted to some extent by providing the shroud segments with a coating of material with an even greater oxidation resistance than the superalloy of which the shroud segments are composed, but this does not solve the weakening problem. Oxidation can be further reduced if the shroud segments are composed of alloys which are significantly more oxidation-resistant than the superalloys used hitherto, but unfortunately such alloys tend to be so much weaker than the superalloys that conventional methods of supporting, locating and cooling shroud segments render their use impractical.

It is therefore an object of the present invention to provide a method of support, location and cooling for shroud segments which contributes to solving the problem of high temperature weakness by ensuring that the shroud segments are favourably stressed.

According to the present invention, a turbine shroud assembly for a gas turbine rotor stage comprises

- a shroud ring comprising a plurality of shroud segments,
- supporting structure circumferentially surrounding the shroud ring and to which the shroud segments are retained, at least the supporting structure consisting of a metallic alloy which retains high strength at elevated temperatures,
- shroud chamber means defined between said shroud segments and said supporting structure,
- means for supplying cooling air to pressurise said shroud chamber means, and
- means for exhausting cooling air from said shroud chamber means to a location downstream of the rotor stage;
- said means for supplying cooling air to said shroud chamber means being adapted to meter said cooling air during operation of the turbine such that the total pressure forces acting outwardly on the shroud segments due to turbine gas pressure are substantially greater than the total pressure forces acting inwardly on the shroud segments due to cooling air pressure in said shroud chamber means, the shroud segments thereby experiencing an outward thrust and having means defining a plurality of load paths distributed over the shroud segments so as to transfer said outward thrust to the supporting structure without overstressing the shroud segments.

The outward thrust on the shroud segments can best be ensured by arranging that during operation of the turbine the pressure of the cooling air in the shroud chamber means is only just sufficient to ensure exhaustion of the cooling air to the location downstream of the rotor stage.

Other features of the invention will become apparent from the description of specific embodiments which follow and the appended claims.

An embodiment of the invention will now be described by way of example only with reference to the accompanying drawings, in which.

The drawings are not to scale.

Figure 1:
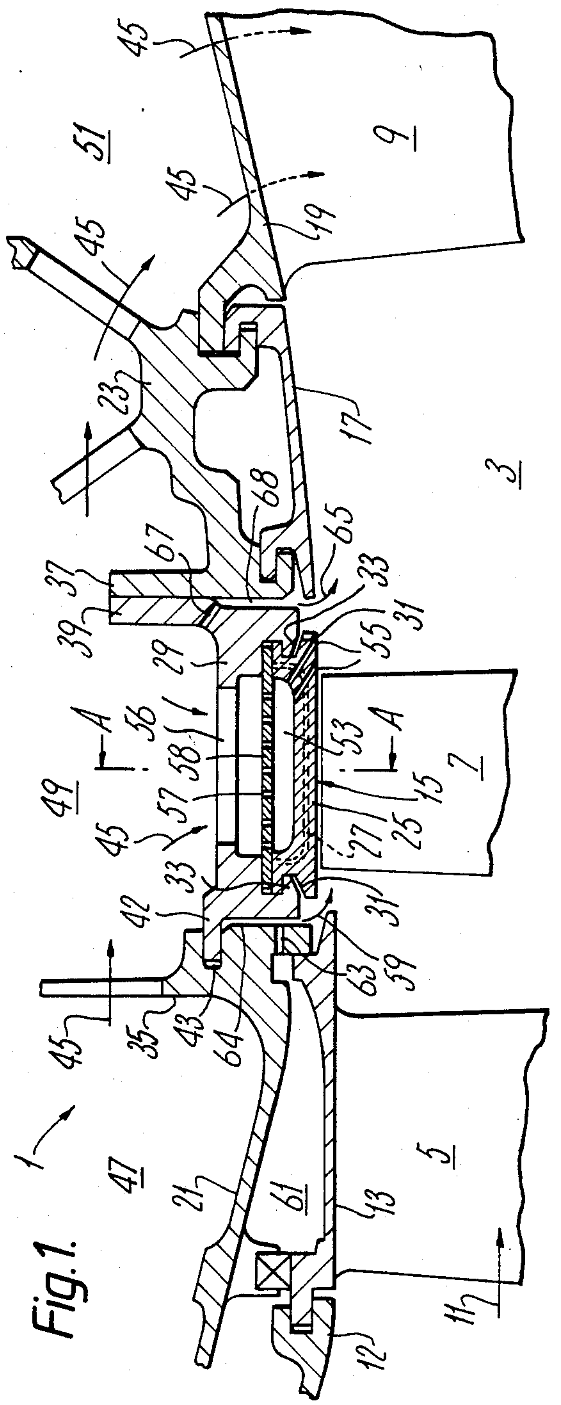
FIG. 1 is a "broken-away" sectional side elevation of part of a gas turbine incorporating the invention.

Referring in more detail to FIG. 1, there is shown part of an axial flow gas turbine 1 as incorporated in a turbofan aeroengine. The turbine 1 has an annular turbine gas passage 3 in which are situated in flow series an annular array of nozzle guide vanes 5, a stage of turbine rotor blades 7, and an annular array of stator vanes 9, only the radially outer portions of these features being shown. Gases 22 from a combustion chamber exit 12 flow past the nozzle guide vanes 5, are guided thereby onto the turbine rotor blades 7, and from thence flow past the stator vanes 9 to the next stage of turbine blades (not shown).

The effective outer boundary of the illustrated portion of turbine gas passage 3 is formed by the outer shrouds 13 of guide vanes 5, a metallic turbine shroud ring 15, a flanged filler ring 17, and the outer shrouds 19 of stator vanes 9.

Guide vanes 5 and stator vanes 9 are fixed at their radially inner ends to static structure (not shown) is known manner. The forward ends of the outer platforms 13 and the inner platforms (not shown) of the guide vanes 5 locate against corresponding portions of the combustion chamber exit 12. Vanes 5 are additionally located at their radially outer platforms 13 against features on a frusto-conical drum member 21 as shown, and the forward parts of outer platforms 19 of vanes 9 are engaged with the rear edge of a support ring 23. Filler ring 17 is also held front and rear by support ring 23. Support ring 23 is itself connected to an outer casing (not shown) of turbine 1, as is the frusto-conical member 21.

The shroud ring 15 is provided to surround the radially outer tips of turbine blades 7 and form a seal against them in order to prevent excessive leakage of the turbine gases over the blade tips between the high pressure and low pressure flanks of the blades. It is composed of a number of shroud segments 25, which describe short arcs in the circumferential direction, this being illustrated in FIG. 2. Sealing between adjacent shroud segments 25 against ingress of gas 11 through the gaps between adjacent segments is provided by means of so-called "strip-seals" 27, which are well known to those skilled in the art, these being narrow metallic strips of relatively small thickness which are a clearance (sliding) fit in slots machined in circumferentially adjacent edges of the shroud segments. The shape of the slots and strip-seals 27 is shown in dashed lines in FIG. 1, and in cross-section in FIG. 2.

The shroud segments 25 composing shroud ring 15 are retained to supporting structure which circumferentially surrounds the shroud ring. The supporting structure is an annular metallic carrier ring 29 and the shroud segments are retained to it by means of a "tongue-and-groove" or "hook" arrangement in which grooves 31 provided in the front and rear edges of the shroud segments engage respective rearwardly and forwardly projecting circular tongues 33 at the front and rear of the carrier ring, the shroud segments being a sliding fit between the tongues 33.

Carrier ring 29 is itself divided into a number of segments to allow for circumferential expansion, these being of greater arc length than the shroud segments, e.g. each carrier ring segment holds three shroud segments. A split line between two carrier ring segments is shown at 34 in FIG. 2. The carrier ring segments are held in position between support ring 23 at their rear and end-ring 35 of frusto-conical member 21 at their front. Support ring 23 is provided with a radially projecting annular flange 37, to which matching flanges 39 on the segments of carrier ring 29 are bolted. In order to support the front of the carrier ring 29 whilst allowing for relative movement due to thermal expansion and contraction, the front of the carrier ring segments are provided with forwardly projecting circular flanges 42 and the rear of the end ring 35 is provided with a circular slot 43, the flanges being received in the slot in a sliding fit as shown.

Figure 2:
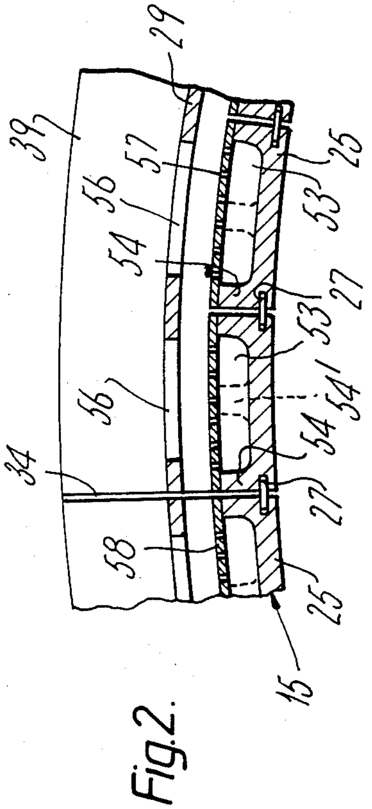
FIG. 2 is a view on section A—A in FIG. 1.

The outer sides of shroud segments 25 are provided with straight-sided depressions or chambers 53 which are defined between strengthening ribs 54 extending fore-and-aft across circumferentially opposite ends of each of the segments to form a box-section as best seen in FIG. 2. In the present embodiment the shroud segments 25 are of relatively short span in the circumferential direction, each requiring the support of only two ribs 54. However, one or more extra ribs or pillars 54' (dashed lines) could be incorporated at equally spaced intervals across the span if necessary to provide extra support. We deem it desirable for the unsupported spans of the shroud segments to be small because of the limited high-temperature strength of the alloys we contemplate utilising for the shroud segments.

Carrier ring 29 basically comprises ring sections front and rear for connection to neighbouring structure as already mentioned, and a cylindrical section connecting the front and rear ring sections, the cylindrical section being provided with large circumferentially spaced apertures 56. Sandwiched between the carrier ring 29 and the shroud segments 25 are part-cylindrical throttle plates 58 which in this case are substantially coextensive axially and circumferentially with the shroud segments though they could be circumferentially coextensive with the carrier ring segments. Carrier ring 29 and shroud segments 25 are designed to receive the throttle plates between them, and the throttle plates are held against sliding movement relative to the carrier ring 29 by location pins (not shown) which protrude from the carrier ring into corresponding holes in the throttle plates. However, the throttle plates are not substantially restrained to the carrier ring 29 in the radially inward direction. It should be noted that throttle plates 58 make contact with carrier ring 29 only over narrow strips near their front and rear edges, but that they make contact with shroud segments 25 not only over the narrow strips near their front and rear edges, but also over the outer surfaces of ribs 54. These ribs 54 therefore provide a seal against the throttle plates 58.

Cooling air for stator vanes 9, carrier ring 29 and shroud segments 25 is supplied as indicated by the arrows 45 from annular chamber 47 surrounding frusto-conical member 21. Chamber 47 is fed by an air bled from the compressor (not shown) of the turbofan. Chamber 47 communicates freely with chamber 49 surrounding carrier ring 29, and chamber 49 supplies chamber 51 surrounding the outer platforms 19 of vanes 9. Stator vanes 9 are hollow and require cooling with air from chamber 51 as shown. In order to cool shroud segments 25, cooling air from chamber 49 flows through apertures 56 in the carrier ring 29 (causing slight cooling of the same) and enters shroud chambers 53 on the outer sides of the shroud segments after being metered through small holes 57 in the throttle plates 58. The cooling air is exhausted from the chambers 53 into the turbine passage 3 just downstream of the turbine blades 7 by means of angled drillings 55 through the rear edges of the segments 25.

Particular reference will now be made to features in the design which facilitate economic use of the cooling air.

In designs for known types of metallic shroud segments made from superalloys, the temperatures of the shroud segments are kept within acceptable upper limits by supplying large mass flows of cooling air to the segments for subsequent exhaustion to the turbine passage. However, our use of more highly oxidation resistant alloys in the ways described below allows higher metal temperatures to be tolerated in the shroud segments without unacceptable danger of failure due to stress concentrations caused by oxidation of the metal, hence the shroud segments require less cooling air and the efficiency of the engine can be increased. In the present instance it is desired to run the shroud segments at temperatures in excess of 1100° C. on their inner surfaces.

One way of utilising more highly oxidation resistant alloys is to make the shroud segments out of them. We have found that an yttria dispersion strengthened FeCrAlY alloy of a hafnia dispersion strengthened FeCrAlHf alloy is suitable for this purpose.

Hitherto, FeCrAlY-type alloys have been known for use as elements in electric furnaces, and as highly oxidation-resistant coatings for machine components made of other less oxidation-resistant alloys, such as nickel-base superalloy gas turbine blades, etc. Other highly oxidation resistant alloys of this general type are known, such as CoCrAlY and NiCrAlY alloys, these being genericaly referred to as "MCraAlY" alloys, where M is a suitable major metallic constituent of the alloy as known to those skilled in the art. We prefer to use the dispersion strengthened FeCrAlY of or FeCrAlHf alloys because they have a high a higher softening temperature than other MCrAlY types, but other MCrAlY types could be used if the correct balance between the heating effect of the turbine gases on the shroud segments and economical use of cooling air is achieved in each case.

It is possible that suitable metallic oxides other than yttria or hafnia, classed with the rare earth oxides, could be used to strengthen the alloy chosen for the shroud segments. Note that it is necessary to produce such alloys for machine components from powder materials by means of a mechanical alloying process as known to those skilled in the art.

As an example, a basic FeCrAlY alloy useful for putting the invention into effect has the composition Carbon <0.03%
Chromium 15–20%
Aluminium 4–5%
Yttrium 0.05–0.4%
Iron the rest.

A problem associated with the use of MCrAlY-type alloys for structural members such as the shroud segments 25 is their very low ultimate tensile strength (UTS). Whereas a typical superalloy may have a UTS of about $48\times10^7$ Pa, the FeCrAlY alloy used here may have a UTS of only about $0.8\times10^7$ Pa.

An alternative way of utilising the highly oxidation resistant alloys is to make the shroud segments predominantly out of a superalloy as known, but to coat the inner surface of the shroud segments with the highly oxidation resistant alloy to protect the superalloy against oxidation. One suitable combination is the nickel base superalloy known by the trade name MAR-M-002, with an MCrAlY-type coating such as the one known by the trade name L-Co-22. The shroud segments are thereby able to withstand higher temperatures with acceptable rates of oxidation, and this again enables reduced cooling air consumption by the shroud segments. However, the higher temperatures reduce the strength of the superalloy, though it is of course still much greater than a MCrAlY-type alloy.

The present invention overcomes the above-described problems of alloy weakness at high temperatures by ensuring that there is a more favourable balance of forces across the shroud segments than in previous designs of shroud assemblies. This statement will be amplified by analysing the balance of forces across the shroud segments 25 in FIGS. 1 and 2, considering the worst case when they are composed of an MCrAlY-type alloy.

In the illustrated arrangement, the only important radially inward pressure forces on each shroud segment are:

(i) the force due to the pressure in chamber 49 acting on the solid area of throttle plate 58 exposed to that pressure (N.B. the throttle plate is free to thrust radially inward against the shroud segments); and (ii) the force due to the pressure of the cooling air in shroud chambers 53 acting on the radially inner surfaces of the chambers.

The only important radially outward pressure force on each shroud segment is the force due to the pressure which the turbine gases exert on the radially inner face of the shroud segment. This pressure varies between the front and rear edges of the shroud segments, the pressure just upstream of the row of blades 7 being much greater (by a factor of 1.5–2.0) than the pressure just downstream of the row. Pressures at intermediate positions on the inner faces of the shroud segments are (when averaged out between high pressure and low pressure flanks of the blades) intermediate in value.

It is an important result of the present invention that even though the sum of the above radially inward forces (i) and (ii) may actually exceed the radially outward force by a large amount, the radially inwardly unsupported span of each shroud segment 25 (i.e. the part extending between the front and rear tongue-and-groove engagements with the carrier ring 29) experiences only a net outwardly directed thrust or pressure force which causes ribs 54 to bear outwards against throttle plates 58, thereby defining load paths which give the segments adequate distributed support against the bending effects of the outwardly directed pressure force so as to prevent overstressing or overstraining of the segments. Moreover, when ribs 54 bear outwards against the throttle plates, shroud chambers 53 are sealed against entry of turbine gases should any get past the strip seals 27.

Remembering that the shroud segments comprise a low strength (and hence low rigidity) material, this desirable result is brought about in the present embodiment by making the throttle plates 58 from a high-strength, highly rigid material which retains its strength at high temperatures, such as a nickel-based superalloy. Thus, under the pressures involved, the throttle plates are substantialy rigid relative to the shroud segments and the inward pressure forces on the plates are transmitted straight through the front and rear outer edge portions of the shroud segments as compressive loads for reaction against the tongues 33 of the carrier ring 29, which is also made of a superalloy. By this means, the shroud segments do not experience any bending effect from inwardly directed pressure forces due to the pressure in chamber 49, but only the bending effects of the inward pressure force due to the cooling air in chambers 53 and the outward pressure force due to the turbine gases 11. Consequently, in order to achieve the desired result of a net radially outward pressure force acting on each shroud segment, it is arranged that the pressure of the cooling air in the chambers 53 on the outer sides of the shroud segments 25 is only just sufficient to ensure adequate exhaustion of the cooling air to the turbine passage 3 through drillings 55, i.e. the pressure in chambers 53 is only slightly higher than the pressure of the turbine gases at the rear edges of the segments just downstream of the turbine blades 7. Because the pressure of the turbine gases on the more forward regions of the shroud segments is greater than it is near their rear edges, the segments experience an outwardly acting pressure force from the turbine passage which is greater than the inwardly acting pressure force due to the pressure of the cooling air, thereby causing the segments to be thrust outwardly against their seatings on the throttle plates as required.

Although the working of the illustrated embodiment of the invention has just been analysed from the point of view of relatively weak shroud segments comprised of an MCrAlY-type alloy, the invention works in the same sort of way for stronger shroud segments made from a superalloy such as that already mentioned, the difference being that superalloy shroud segments are somewhat less flexible than MCrAlY-type alloys, even at the high temperatures involved, and therefore the loading distributions between the throttle plates 58, shroud segments 25 and tongue features 33 will be somewhat modified. However, a net outward thrust on the shroud segments can still be achieved, so that in conjunction with the use of the above-mentioned oxidation-resistant coating, a satisfactory margin of safety can be obtained at the desirable condition of reduced cooling air consumption with higher shroud temperatures.

The supply pressure of the cooling air in the chamber 49 is of course the same as for previous designs of shroud segments because the cooling air 45 is required for other tasks such as cooling stator vanes 9. The required metering of the cooling air supply to the shroud segments, i.e. the required drop in pressure between chamber 49 and chambers 53, is achieved by careful sizing and spacing of holes 57 in throttle plates 58.

It will be noted that carrier ring 29 and throttle plates 58 are shielded from the direct effects of the hot gases 11 by the shroud segments 25, and they also experience some cooling due to the flow of cooling air into chambers 53 of the shroud segments. However, the conductive transfer of heat into these components from the shroud segments 25 can also be minimised by providing, at the locations where the shroud segments make contact with the carrier ring 29 and the throttle plates 58, a thermal barrier coating on the shroud segments and/or on the carrier ring and the throttle plates. Known thermal barrier coatings include, for example boron nitride, yttria stabilized zirconia, or the so-called "magnesium zirconate" materials available from such manufacturers as Metco.

The forward inner edge of the carrier ring 29 is conventionally protected from the effects of turbine gases 11 entering the gap between the rearward edges of the vane platforms 13 and the forward edges of the shroud segments 25, by means of high pressure air 59 which is fed to the gap via drillings 63 and clearance 64 from annular chamber 61 between platforms 13 and frustoconical member 21. The air 59 is supplied to the gap at a pressure in excess of the pressure of turbine gases 11 just upstream of the turbine blades 7, the chamber 61 being pressurised by a bleed from the compressor to a pressure considerably in excess of the pressure in chamber 47.

Similarly, the rear inner edge of the carrier ring 29 is protected from turbine gases 11 by means of air 65 which is fed to the gap between the rear edges of the shroud segments and the forward edge of the filler ring 17 from chamber 49 via drillings 67 and clearance 68. The air 65 can be supplied at a lower pressure than air 59 because of the lower pressure of the turbine gases 11 downstream of the turbine blades 7.

In FIGS. 1 and 2, the ribs 54 on the radially outer sides of segments 25 make contact with the radially inner surfaces of the throttle plates 58 in order to define load paths for transfering the radially outward pressure forces on the segments to the carrier ring 29. In an alternative arrangement (not shown), the radially outer sides of the shroud segments make contact with support structure through load paths defined by areas of contact between ribs provided on the shroud segments as before, and further ribs provided on the support structure, the further ribs being oriented transversely of the ribs on the shroud segments. The ribs on the support structure may be on throttle plates provided as separate components sandwiched between the carrier ring and the shroud segments as in FIGS. 1 and 2. Alternatively, throttle plates as separate components may be absent, the ribs being provided on a radially inner surface of the carrier ring. In either case, means are provided for throttling the supply of cooling air to the chambers between the ribs on the shroud segments on the same principle as explained in relation to FIGS. 1 and 2. Note that if the cooling air throttling function is performed by holes in an integral portion of the carrier ring, rather than by separate throttle plates, the shroud segments do not have to cope with the radially inward pressure forces transmitted by such throttle plates.

The provision of ribs on the support structure as well as on the shroud segments produces smaller areas of contact between the support structure and the shroud segments, thereby reduceing conductive heat transfer from the shroud segments to the suppport structure. Heat transfer may be further reduced by the use of thermal barrier coatings as previously described. In order to provide for greater cooling of the support structure and the shroud segments, the holes which feed cooling air to the chambers between the ribs on the shroud segments may extend as drillings through the ribs on the support structure and through the ribs on the shroud segments, these drillings acting to cool both sets of ribs before discharging to the chambers between the ribs.

Note that in the case of the embodiment described in relation to FIGS. 1 and 2 above, and in the case of the alternative embodiment described above, cooling of the shroud segments can be enhanced without necessarily using more cooling air by ensuring that cooling air supplied to the chambers between the ribs on the shroud segments issues from the cooling air holes or drillings in such a way as to form jets of cooling air which impinge on the radially inner sides of the chambers to pierce the boundary layer of hot air and hence cool the shroud segments more effectively.

I claim:

1. A turbine shroud assembly for a gas turbine rotor stage, comprising a shroud ring comprising a plurality of shroud segments consisting of a metallic alloy, supporting structure circumferentially surrounding said shroud ring and to which said shroud segments are retained, at least said supporting structure consisting of a metallic alloy which retains its high strength at elevated temperatures, the supporting structure having a high strength at its normal operating temperature and the shroud segments having a substantially lower strength than the supporting structure at their normal operating temperature, retaining means provided on said supporting structure and said shroud segments for retaining said shroud segments to said supporting structure, means defining shroud chamber means between said shroud segments and said supporting structure, means for supplying cooling air to pressurise said shroud chamber means, and means for exhausting said cooling air from said shroud chamber means to a location downstream of said rotor stage;

said means for supplying cooling air to said shroud chamber means being adapted for metering said cooling air during operation of said turbine such that the total pressure forces acting outwardly on said shroud segments due to turbine gas pressure are substantially greater than the total pressure forces acting inwardly on said shroud segments due to cooling air pressure in said shroud chamber means, said shroud segments thereby experiencing an outward thrust, said shroud segments having means defining a plurality of load paths in addition to said retaining means distributed over said shroud segments so as to transfer said outward thrust to said supporting structure without overstressing said shroud segments.

2. A turbine shroud assembly according to claim 1 in which said means for supplying cooling air to pressurise said shroud chamber means is adapted to meter said cooling air during operation of said turbine such that the pressure in said shroud chamber means is only just sufficient to ensure exhaustion of said cooling air to said location downstream of said rotor stage.

3. A turbine shroud assembly according to claim 1 in which said shroud chamber means are defined between said means defining a plurality of load paths.

4. A turbine shroud assembly according to claim 3 in which said means defining said plurality of load paths comprise rib portions extending across said shroud segments to strengthen same.

5. A turbine shroud assembly according to claim 1 in which said supporting structure includes a surface for reacting said outward thrust from said shroud segments and sealing therewith, which surface is substantially cylindrical about the rotational axis of the turbine.

6. A turbine shroud assembly according to claim 1 in which said means for supplying cooling air to pressurise said shroud chamber means comprises a plurality of holes extending through said supporting structure.

7. A turbine shroud assembly according to claim 1 in which said shroud segments have a unitary, load-bearing structure.

8. A turbine shroud assembly for a gas turbine rotor stage, comprising a shroud ring comprising a plurality of shroud segments consisting of a metallic alloy, each said shroud segment having opposed edge portions defining groove features, supporting structure circumferentially surrounding said shroud ring and to which said shroud segments are retained, at least said supporting structure consisting of a metallic alloy which retains its high strength at elevated temperatures, the supporting structure having a high strength at its normal operating temperature and the shroud segments having a substantially lower strength than the supporting structure at their normal operating temperature, retaining means provided on said supporting structure and said shroud segments for retaining said shroud segments to said supporting structure, means defining shroud chamber means between said shroud segments and said supporting structure, means for supplying cooling air to pressurise said shroud chamber means, and including metering means for metering of said cooling air and means for exhausting said cooling air from said shroud chamber means to a location downstream of said rotor stage; said supporting structure also including plate members defining a surface for reacting said outward thrust from said shroud segments and for sealing therewith, said plate members having holes therein for said metering of said cooling air, a ring portion outboard of said plate members, and hook means extending from said ring portion to define tongue features thereon, which tongue features engage said groove features, whereby said shroud segments are retained to said supporting structure;

wherein said plate members are sandwiched between said shroud segments and said ring portion of said supporting structures, said plate members spanning the distance between said opposed edge portions of said shroud segments such that at least some of the inward pressure forces on said plate members due to said metering of cooling air are transmitted through said opposed edge portions of said shroud segments for reaction against said tongue features, said means for supplying cooling air to said shroud chamber means being adapted for metering said cooling air during operation of said turbine such that the total pressure forces acting outwardly on said shroud segments due to turbine gas pressure are substantially greater than the total pressure forces acting inwardly on said shroud segments due to cooling air pressure in said shroud chamber means, said shroud segments thereby experiencing an outward thrust, said shroud segments having means defining a plurality of load paths in addition to said retaining means distributed over said shroud segments so as to transfer said outward thrust to said supporting structure without overstressing said shroud segments.

9. A turbine shroud assembly according to claim 8 in which said shroud segments have a unitary, load-bearing structure.

* * * * *